United States Patent [19]

Ferlan et al.

[11] Patent Number: 4,514,889
[45] Date of Patent: May 7, 1985

[54] SPRING CLIP INSERTER TOOL

[75] Inventors: Stephen J. Ferlan, Wilkins Township, Allegheny Count; Leonard T. Gesinski, North Huntingdon Twp., Westmoreland Co., both of Pa.

[73] Assignee: Westinghouse Electric Corp., Pittsburgh, Pa.

[21] Appl. No.: 548,548

[22] Filed: Nov. 3, 1983

[51] Int. Cl.³ .............................................. B23P 19/04
[52] U.S. Cl. ......................................... 29/229; 29/235
[58] Field of Search .......................... 29/229, 225, 235

[56] References Cited

U.S. PATENT DOCUMENTS

| 2,441,846 | 5/1948 | Schaaff et al. | 29/229 |
| 2,518,142 | 8/1950 | Huntington | 29/229 |
| 3,272,246 | 9/1966 | Bohnet | 81/58.3 |

Primary Examiner—James L. Jones, Jr.
Attorney, Agent, or Firm—D. E. Erickson

[57] ABSTRACT

A tool (30) for facilitating insertion or removal of a C-shaped spring clip in a burnable poison rod, or the like, includes an outer member (38) secured to a front handle (32) and an inner member (40) extending through the outer member and the front handle which is connected to a coaxial rear handle (34). The handles (32, 34) are interconnected for relative rotation by means of a set screw (64) and circumferential groove (56). The distal ends of the inner and outer members (38, 40) are notched to receive the spring clip and engage it for compression. Provided between the handles (32, 34) is a locking and release assembly (42) and an adjustable positioning ring (58) by which the spring clip can be compressed, locked in compressed condition for insertion, and then released in the desired position before withdrawing the tool.

5 Claims, 7 Drawing Figures

U.S. Patent May 7, 1985 Sheet 1 of 2 4,514,889
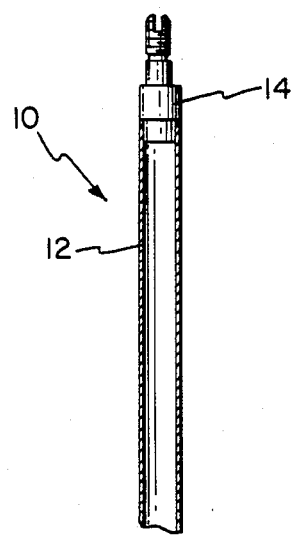
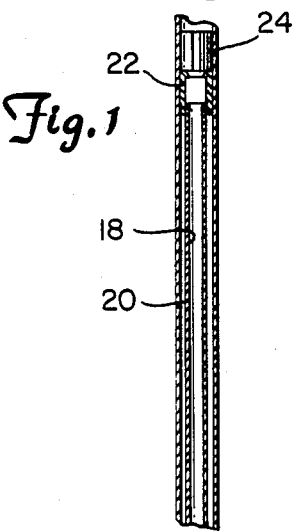
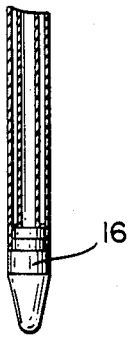
Fig.1
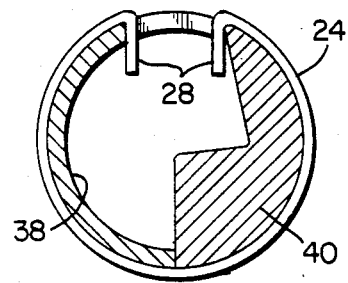
Fig.2
Fig.4

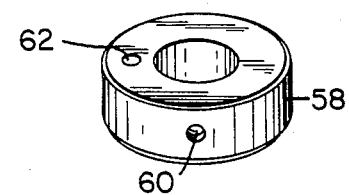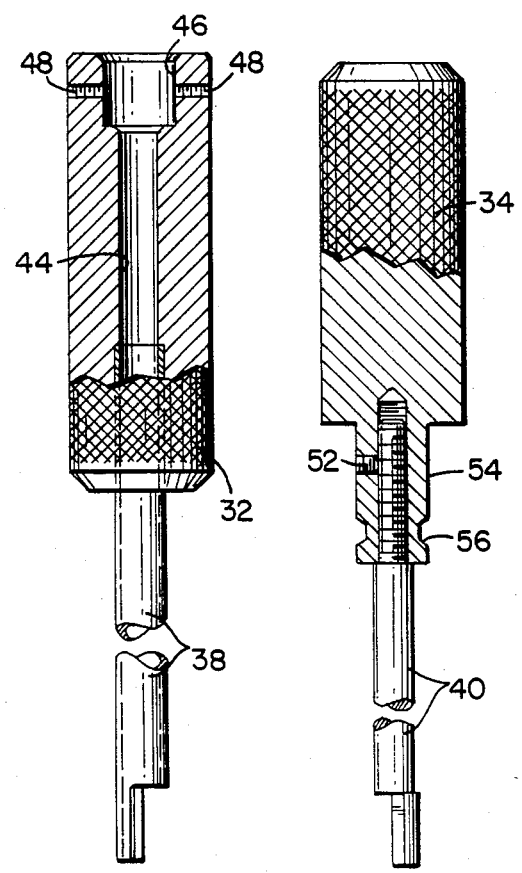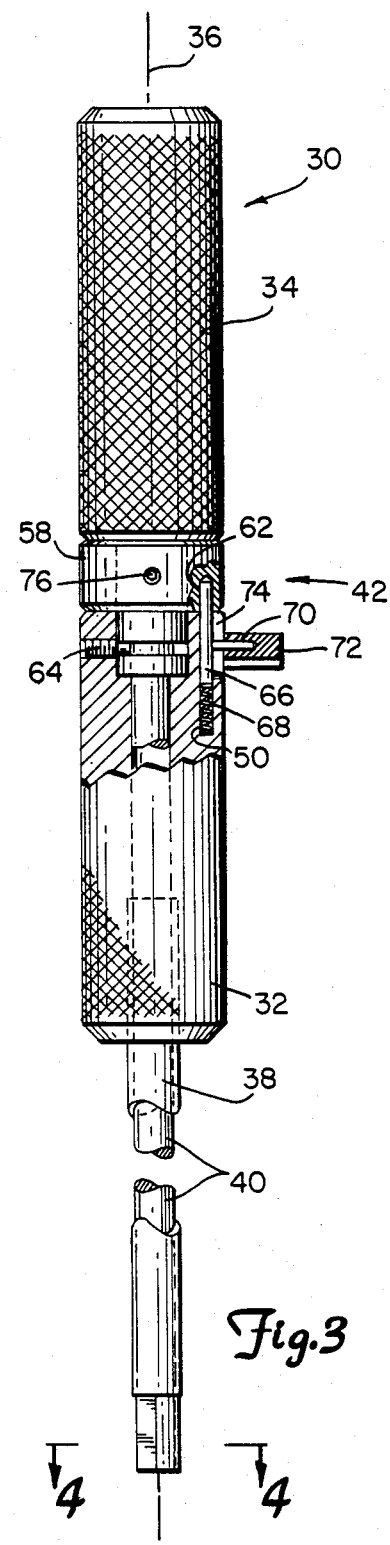

SPRING CLIP INSERTER TOOL

BACKGROUND OF THE INVENTION

The present invention relates generally to a tool for inserting and releasing a C-shaped spring clip into an elongate hollow structure. More particularly, this invention concerns a tool which is especially adapted for compressing a C-shaped spring clip, holding it in compressed position during insertion into a burnable poison rod of a fuel assembly of a nuclear reactor, and then releasing the spring clip for expansion in the desired position before withdrawing the tool from the rod.

Nuclear reactors of the type utilized in power generation incorporate a large number of fuel assemblies arranged in a suitable configuration. Each fuel assembly includes numerous fuel rods which are held in a fixed array by a "skeleton" comprising grids spaced at lengthwise intervals along the fuel rods, control rod guide thimbles interconnecting the grids and extending beyond the ends of the fuel rods, and top and bottom nozzles. Each fuel rod consists of a stack of fuel pellets within a tube, sealed by end plugs, which tube constitutes the primary containment boundary for the radioactive nuclear fuel.

In addition to fuel rods, such fuel assemblies also include control rods, secondary source rods, and burnable poison rods. The control rods are reciprocally movable within the guide thimbles to control the fission process over the life of the fuel assembly. The secondary source rods and burnable poison rods are not reciprocally movable, but are mounted in removable subassemblies which can be inserted into the fuel assembly. These two types of rods are generally used only at the beginning of the fuel cycle. The secondary source rods contain highly enriched material and thus provide additional reactivity to facilitate startup.

On the other hand, the burnable poison rods include neutron absorbing material, such as boron carbide, and function to enhance distribution of fuel during burnup. The neutron absorbing material of such rods is relatively brittle and expands during operation of the reactor, such that it is desirable to provide a mechanical restraint within the burnable poison rods to preclude any unnecessary movement of the absorber material during shipping and handling while permitting axial expansion later after being put in operation. It is therefore desirable to provide yieldable restraining devices in burnable poison rods.

Various types of springs and the like have been used for axial restraining purposes within a burnable poison rod. Helical coil springs often have been used, however, these have tended to be relatively long requiring too much space within the rods. Such springs are simply inserted into the tube before attachment of the adjacent end cap. More recently, C-shaped spring clips like that shown in U.S. Pat. No. 4,080,253 assigned to the assignee hereof have been utilized for this purpose. Such C-shaped clips are relatively compact and are adapted for positioning by means of an interference fit within the rods so as to provide sufficient frictional resistance to hold the pellets firmly in place during shipping and handling, while allowing controlled slippage to accomodate growth of the pellets during irradiation. Such clips are thus designed to provide predetermined frictional resistance with the inner walls of the rods, and are preferably compressed or deformed before insertion and positioning within the rods. Proper positioning of such spring clips therefore entails first circumferentially compressing the clips, inserting the compressed clips into the rods, and then releasing the clips in the desired positions. This can be both difficult and time consuming. Inserting the clips into the ends of the rods and then driving them inward to the proper positions is not desirable.

A tool has been developed for inserting such C-shaped spring clips into burnable poison rods. With this tool the clip is compressed by pinching before insertion into a slot in the end of a tool rod, and released by sliding an outer tube downward to move the clip off the slotted rod. This tool is thus characterized by a push-pull action which makes proper positioning of the clip difficult. It will be appreciated that such clips must be installed in engagement with the neutron absorber material, without gaps therebetween, to function effectively. Further, it is difficult to remove such clips with this type of tool, such as for repair of the rod. Heretofore, there has not been available a tool by which such clips could be conveniently compressed, inserted, and then released in the precise desired positions, or removed after insertion.

A need has thus arisen for a spring clip inserter tool of precise construction by which spring clips can be conveniently compressed, locked in compressed condition for insertion into the rod, and then positively released at the desired position before withdrawing the tool.

SUMMARY OF THE INVENTION

The present invention comprises a spring clip inserter tool which overcomes the foregoing and other difficulties associated with the prior art. In accordance with the invention, there is provided a tool which is adapted to facilitate insertion of spring clips of C-shaped cross section into the burnable poison rods of a fuel assembly of a nuclear reactor. The preferred embodiment of the tool includes a front handle secured to an elongate tube. A rear handle is secured to a shaft extending through the tube and a bore in the front handle. The front and rear handles are thus coaxially positioned to facilitate relative rotation between the tube and shaft, the distal ends of which are adapted to receive a spring clip thereon and engage the inwardly turned edges of the clip for compression. The handles are constrained against relative axial movement away from each other. A positioning ring is provided between the handles for adjustable rotational positioning by means of a set screw. A locking and release assembly is also provided so that the handles can be locked against rotational movement after they have been turned in opposite directions to compress the spring clip as necessary. After insertion into the rod, the locking and release assembly is released allowing the spring clip to expand into position and the tool to be withdrawn from the rod. A reverse procedure can be followed to remove the clip from the rod.

BRIEF DESCRIPTION OF THE DRAWINGS

A better understanding of the invention can be had by reference to the following Detailed Description in conjunction with the accompanying Drawings, wherein:

FIG. 1 is a vertical section view of a burnable poison rod of the type utilized in a fuel assembly of a nuclear reactor, with a C-shaped spring clip therein;

FIG. 2 is an enlarged perspective view of the spring clip in the burnable poison rod;

FIG. 3 is an elevational view (partially cut away) of the spring clip inserter tool of the invention;

FIG. 4 is an enlarged sectional view of the end of the tool showing a spring clip positioned thereon;

FIG. 5 is an elevational view (partially cut away) of the front handle and outer tube portion of the tool;

FIG. 6 is an elevational view (partially cut away) showing the rear handle and inner shaft portion of the tool; and FIG. 7 is a perspective view of the positioning ring.

DESCRIPTION OF THE PREFERRED EMBODIMENT

Referring now to the Drawings, wherein like reference numerals designate like or corresponding elements throughout the views, and particularly referring to FIG. 1, there is shown a burnable poison rod 10 of the type utilized in fuel assemblies of a nuclear reactor in a power generating plant. The burnable poison rod 10 includes an elongate metal tube 12 sealed by an upper end plug 14 and a lower end plug 16. The tube 12 and end plugs 14 and 16 are formed of suitable material, such as stainless steel or zircoly capable of withstanding the severe conditions encountered during operation of the reactor. A concentric inner tube 18 is provided in the lower end of the outer tube 12. Suitable pelletized neutron absorbing material 20, such as boron carbide, is provided within the annular space between tubes 12 and 18, which space is closed at the upper end by a spacer 22. A spring clip 24 is provided atop the spacer 22 for yieldably retaining it and material 20 in axial position in order to avoid damage during shipping and handling, while at the same time permitting expansion of the neutron absorbing material as necessary during operation of the reactor.

FIG. 2 is an enlarged perspective view of the spring clip 24. It will be noted that the spring clip 24, which can be formed from spring steel or other suitable material, is generally cylindrical and of C-shaped cross section. The spring clip 24 includes a longitudinal separation 26 bounded by opposite ends 28 which are turned inwardly to facilitate engagement with the inserter tool of the invention for insertion in or removal from the burnable poison rod 10, as will be explained more fully hereinafter.

Referring now to FIGS. 3 and 4, there is shown the inserter tool 30 of the invention which is particularly adapted for inserting a C-shaped spring clip, such as spring clip 24, into a burnable poison rod 10. Although the tool 30 herein is particularly adapted for inserting spring clips into burnable poison rods, it will be understood that the invention can also be used for inserting or removing similar clips in fuel rods, secondary source rods, or other hollow members. Basically, the tool 30 includes a front handle 32 and rear handle 34 which are coaxially positioned and interconnected for rotation about a common longitudinal axis 36. Handles 32 and 34 are preferably knurled as shown to facilitate manipulation. The front handle 32 is secured to the proximal end of a hollow outer tube 38. The rear handle 34 is secured to the proximal end of an inner shaft 40 extending through the tube 38 and front handle 32. The distal ends of the tube 38 and shaft 40 are notched, as is best seen in FIG. 4, to receive the spring clip 24 longitudinally thereon. The spring clip 24 has been omitted from FIG. 3 for clarity. The tool 30 also includes a locking and release assembly 42 which enables the clip 24 to be held in predetermined compressed condition after the handles 32 and 34 have been rotated in opposite directions.

FIG. 5 shows further constructional details of the front handle 32 and outer tube 38. The outer tube 38 fits into a longitudinal bore 44 extending through the front handle 32. The bore 44 is preferable stepped as shown to provide a shoulder against which the inner or proximal end of the hollow tube 38 seats. The tube 38 and handle 32 are fixedly secured together, such as by brazing. A counter bore 46 is provided at the opposite end of the front handle 32, together with a pair of diametrically opposed radial holes 48. An offset blind longitudinal hole 50, as shown in FIG. 3, is also provided in the same end of the front handle 32 for receiving a portion of the locking and release assembly 42.

Turning now to FIG. 6, further constructional details of the rear handle 34 and the inner shaft 40 can be seen. The shaft 40, which is dimensioned for positioning within the outer tube 38, is threadedly secured to the rear handle 34 and locked in place by means of a set screw 52 extending through a radial opening in the reduced inner end portion 54 of the handle. An external circumferential groove 56 is also provided in the reduced end portion 54 for purposes of innerconnecting the front and rear handles 32 and 34, as will be explained below.

FIG. 7 shows the ring 58 which is preferably mounted on the reduced end portion 54 of the rear handle 34 between the front and rear handles. The ring 58 includes a through radial hole 60 and a blind longitudinal hole 62 extending into one side thereof. The ring 58 functions in conjunction with the locking and release assembly 42.

Referring again to FIG. 3, it will be apparent that the reduced end portion 54 of the rear handle 34 fits into the counter bore 46 of the front handle 32. Set screws 64, only one of which is shown, are provided in the radial holes 48 of the front handle 32 for extension into the groove 56 on the reduced end portion 54 to constrain the handles against axial disconnection while permitting relative rotational movement thereof. The locking and release assembly 42 is located between the front and rear handles 32 and 34. In particular, the assembly 42 includes a longitudinal pin 66 slidable within the hole 50 of the front handle 32 toward and away from the ring 58 and hole 62 therein. A compression spring 68 is provided in the bottom end of the hole 50 for urging the pin 66 toward ring 58. The pin 66 in turn is connected by a second pin 70 to an external thumb release 72. A notch 74 is provided along the upper end of the hole 50 to accommodate travel of pins 66 and 70.

The spring clip inserter tool 30 of the invention functions as follows. The spring clip 24 to be inserted is first slipped over the distal ends of tube 38 and shaft 40 as shown in FIG. 4 with ends 28 extending inside the notched ends of the tube and shaft. Handles 32 and 34 are then turned in opposite directions about axis 36 to draw the ends 28 of the spring clip 24 together and thereby compress the spring clip until the pin 66 of the locking and release assembly 42 is urged by spring 68 into hole 62 of the ring 58 on the rear handle to lock the handles against further rotational movement. Positioning of the locking ring 58 is adjustable by means of a set screw 76 in the hole 60 of the ring, as shown in FIG. 3. This permits adjustability of the locking position of the assembly 42 according to the amount of compression necessary to reduce the circumferential size of the spring clip as required. The tool 30 is then inserted into an open end of the burnable poison rod or the like, to position the spring clip 24 as desired, after which the locking and release assembly 42 is released by depressing the thumb release 72 so that the spring clip 24 can expand and thereby elastically secure itself by means of an interference fit in the desired position. The tool 30 is then withdrawn. The reverse procedure can be followed to remove the clip after insertion.

Although the preferred embodiment of the tool 30 incorporates an adjustable locking ring 58 with a single locking hole 62, however, it will be understood that other equivalent structures could also be utilized. For example, ring 58 could be omitted altogether with the locking hole 62 being provided directly in the inner end of the rear handle 34. Similarly, a plurality of circumferentially spaced locking holes 62 can be provided in the locking ring 58 or the inner end of the rear handle 34 to provide discrete adjustability. These alternate constructions are considered fully equivalent to the disclosed structure.

We claim:

1. A tool for inserting a spring clip with inwardly turned ends into a hollow member, comprising:
   coaxially disposed inner and outer members each having distal and proximal ends, the distal ends of said members being adapted to receive the spring clip thereon and engage the inwardly turned ends of the spring clip;
   a front handle secured to the proximal end of said outer member;
   a rear handle secured to the proximal end of said inner member;
   means for innerconnecting said handles for relative rotational movement; and
   means for releasably locking said handles against relative rotational movement, wherein said handles are coaxially disposed, and wherein said means for releasably locking said handles comprises: a rotatable ring disposed between adjacent ends of said handles; means for selectively locking said ring against rotation relative to one of said handles; a pin slidably disposed in a longitudinal slot located in the adjacent end of the other handle, said pin being movable relative to a corresponding hole in said rotatable ring; an external thumb release secured to said pin; and a spring disposed in the longitudinal slot of said other handle for normally urging said pin into engagement with the hole in said ring.

2. A tool for inserting a spring clip of generally C-shaped cross section into a hollow member, comprising:
   inner and outer elongate concentric members each having distal and proximal ends, the distal ends of said members including predetermined notches adapted for receiving a spring clip thereon;
   a front handle secured to the proximal end of said inner member;
   a rear handle secured to the proximal end of said outer member, said handles being coaxially disposed with adjacent ends of said handles having interfitting male and female portions of circular cross section;
   means including a set screw and circumferential groove in the opposite adjacent ends of said handles for constraining said handles against axial movement while permitting relative rotation thereof;
   the adjacent ends of said handles including opposite longitudinal holes therein;
   a pin slidably disposed in the longitudinal hole of one of said handles;
   an external thumb release secured to said pin; and
   a spring disposed in the longitudinal hole in said one handle for urging said pin into engagement with the other longitudinal hole to selectively lock said handles against relative rotational movement.

3. The tool of claim 2, wherein said handles are knurled to facilitate manipulation.

4. The tool of claim 2, wherein one of said handles includes a rotatable end portion with the corresponding longitudinal hole therein, and further including means for selectively locking the rotatable end portion against rotation relative to said handle.

5. Apparatus for inserting a spring clip of generally C-shaped cross section with inwardly turned ends into a hollow member, such as a burnable poison rod, comprising:
   inner and outer elongate concentric members each having distal and proximal ends, the distal ends of said members including predetermined notches adapted for receiving a spring clip thereon;
   a front handle secured to the proximal end of said inner member;
   a rear handle secured to the proximal end of said outer member, said handles being coaxially disposed with adjacent ends of said handles having interfitting male and female portions of circular cross section;
   means including a set screw and circumferential groove in the interfitting end portions of said handles for constraining said handles against axial movement while permitting relative rotation thereof;
   a rotatable ring on the male portion between said handles;
   means for selectively locking said ring against rotation relative to said rear handle;
   a pin slidably disposed in a longitudinal slot located in the adjacent end of said front handle, said pin being movable relative to a corresponding hole in said rotatable ring;
   an external thumb release secured to said pin; and
   a spring for normally urging said pin into engagement with the hole in said ring to lock said handles against rotational movement.

* * * * *